Nov. 10, 1970 G. L. CLAPPER 3,539,994

ADAPTIVE TEMPLATE PATTERN CATEGORIZING SYSTEM

Filed Sept. 14, 1967 5 Sheets-Sheet 1

INVENTOR
GENUNG L. CLAPPER

BY John B Tirone

ATTORNEY

ADAPTIVE TEMPLATE PATTERN CATEGORIZING SYSTEM

Nov. 10, 1970 G. L. CLAPPER 3,539,994

ADAPTIVE TEMPLATE PATTERN CATEGORIZING SYSTEM

Filed Sept. 14, 1967 5 Sheets-Sheet 4

United States Patent Office 3,539,994
Patented Nov. 10, 1970

3,539,994

ADAPTIVE TEMPLATE PATTERN CATEGORIZING SYSTEM

Genung L. Clapper, Raleigh, N.C., assignor to International Business Machines Corporation, Armonk, N.Y., a corporation of New York Filed Sept. 14, 1967, Ser. No. 667,836
Int. Cl. G06k 9/12; G11c 5/02
U.S. Cl. 340—146.3 3 Claims

ABSTRACT OF THE DISCLOSURE

A pattern categorization system in which a plurality of binary bits representing a pattern is expanded and applied in parallel to a group of previously trained adaptive templates for categorizing the pattern.

This invention relates to a pattern categorization or identification system and more particularly to a system for categorizing or identifying speech, graphic or other patterns which can be expressed in digital form.

In the prior art, pattern categorization has been accomplished by fixed "logic" or by linear decision functions. The logic was determined heuristically and required a great deal of effort. Computer programs simulating adaptive devices were used to implement the linear decision function. An example of the latter is described in "A Pattern Identification System Using Linear Decision Functions" by J. S. Griffin, Jr., J. H. King, Jr. and C. J. Tunis, IBM Systems Journal, vol. 2, September–December 1963, pp. 248–267. Alternatively, adaptive mechanisms per se such as the "Perceptron" and "Adaline" have been utilized for pattern categorization. A common problem with these devices is the lengthy training period required to establish weights or gains of the linear decision functions.

One object of this invention is to provide an adaptive categorization system which provides very fast training and is able to discriminate on small differences.

Another object of the invention is to provide a pattern categorization system which is capable of accepting a wide divergence of input samples in a desired category and at the same time discriminate between categories having small differences therebetween.

Yet another object of the invention is to provide a system as set forth above which is modular in nature and is inexpensive to manufacture.

The invention contemplates a system for categorizing patterns expressed as $n$ binary bits and comprises, first means for expanding the $n$ coded bits to a fixed $m$ out of $n'$ code where $n'$ equals $kn$, a plurality of adaptive templates responsive in parallel to said $m$ bits for simultaneously comparing the $m$ bits with data preset into the templates and each providing an output indicative of the degree of comparison, and means responsive to the template outputs for establishing a variable threshold for inhibiting all but the largest output.

The foregoing and other objects, features and advantages of the invention will be apparent from the following more particular description of a preferred embodiment of the invention illustrated in the accompanying drawings.

Figure 1:
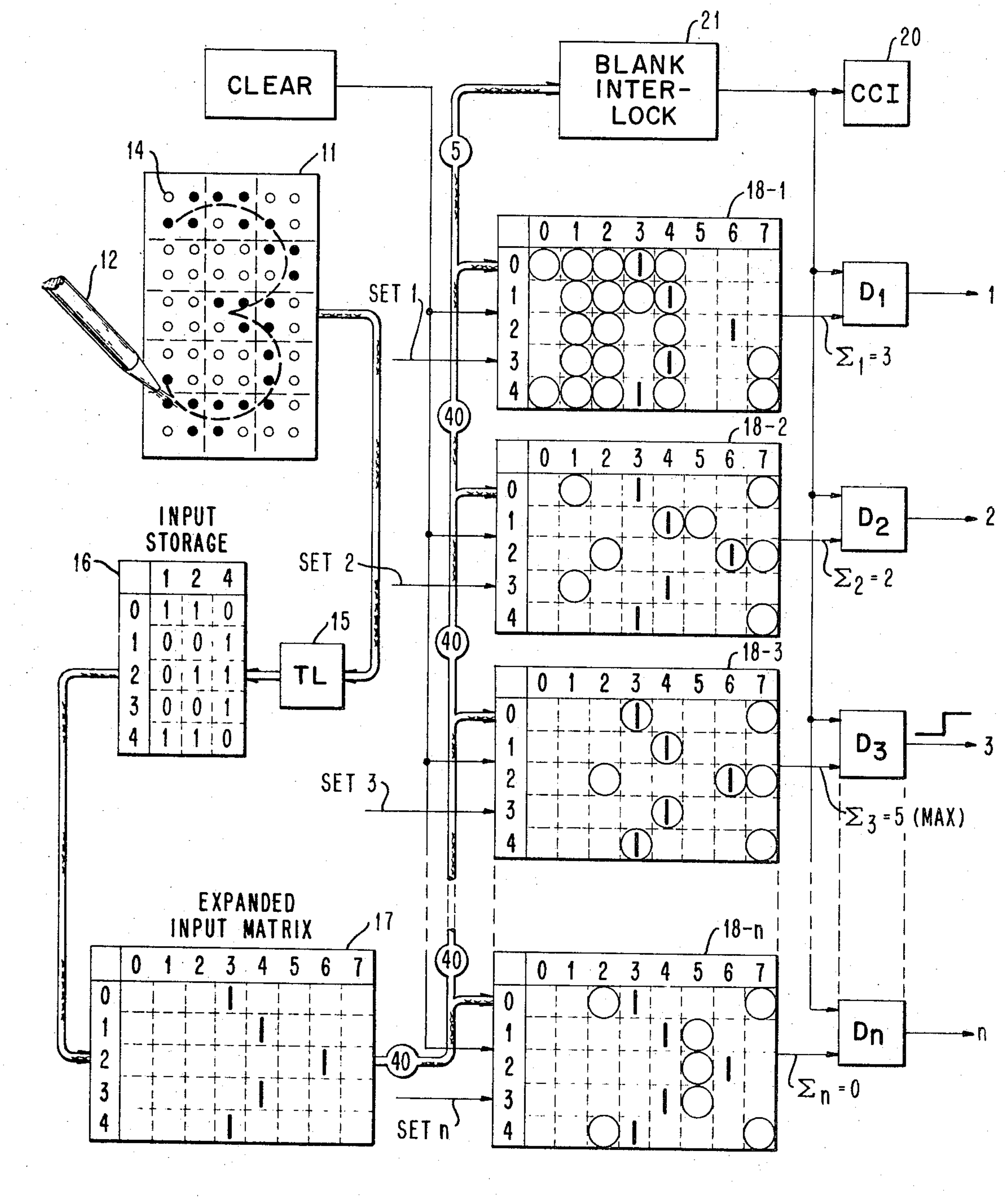
FIG. 1 is a block diagram of a novel categorization system constructed in accordance with the invention.
Figure 2:
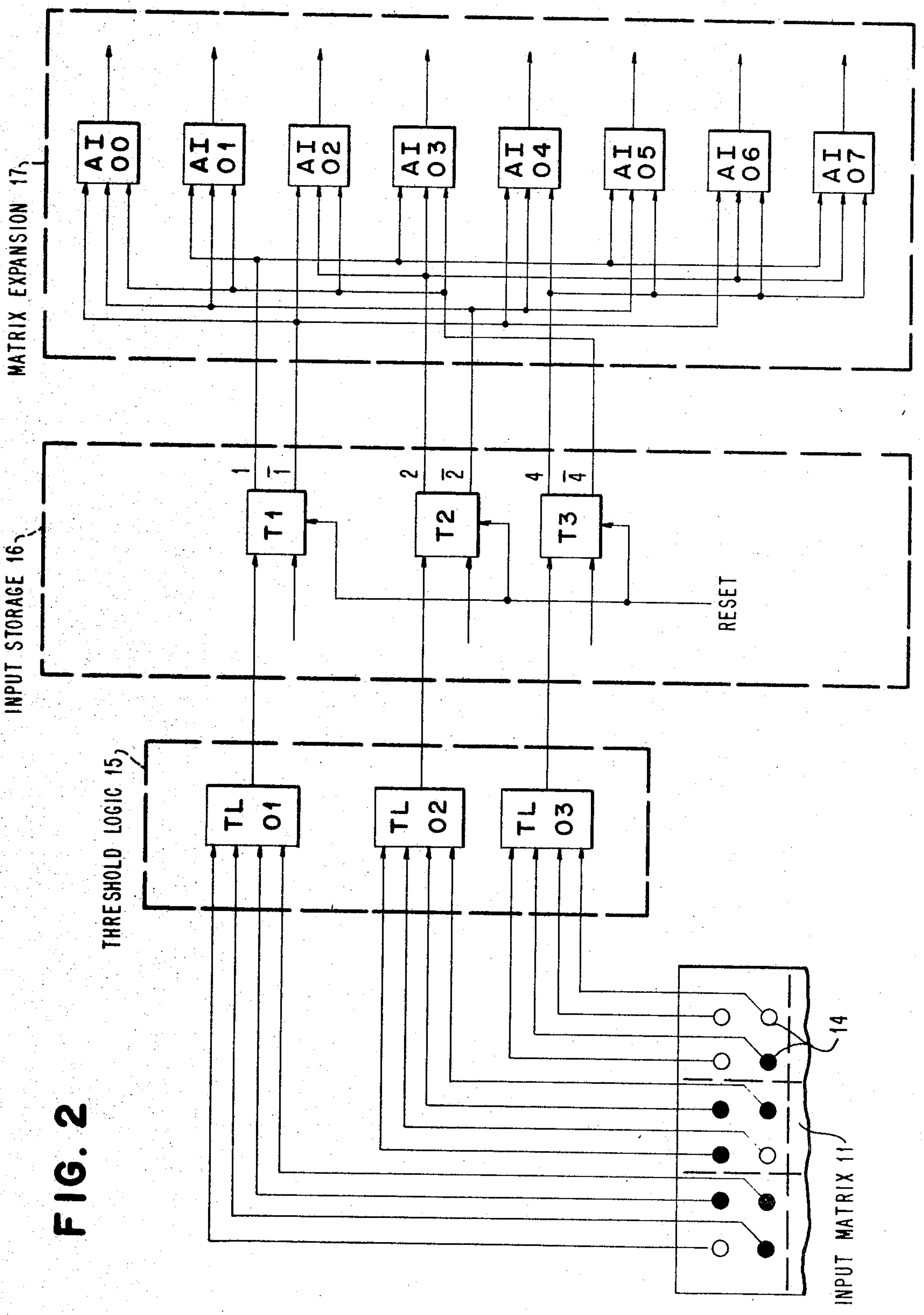
Figure 3:
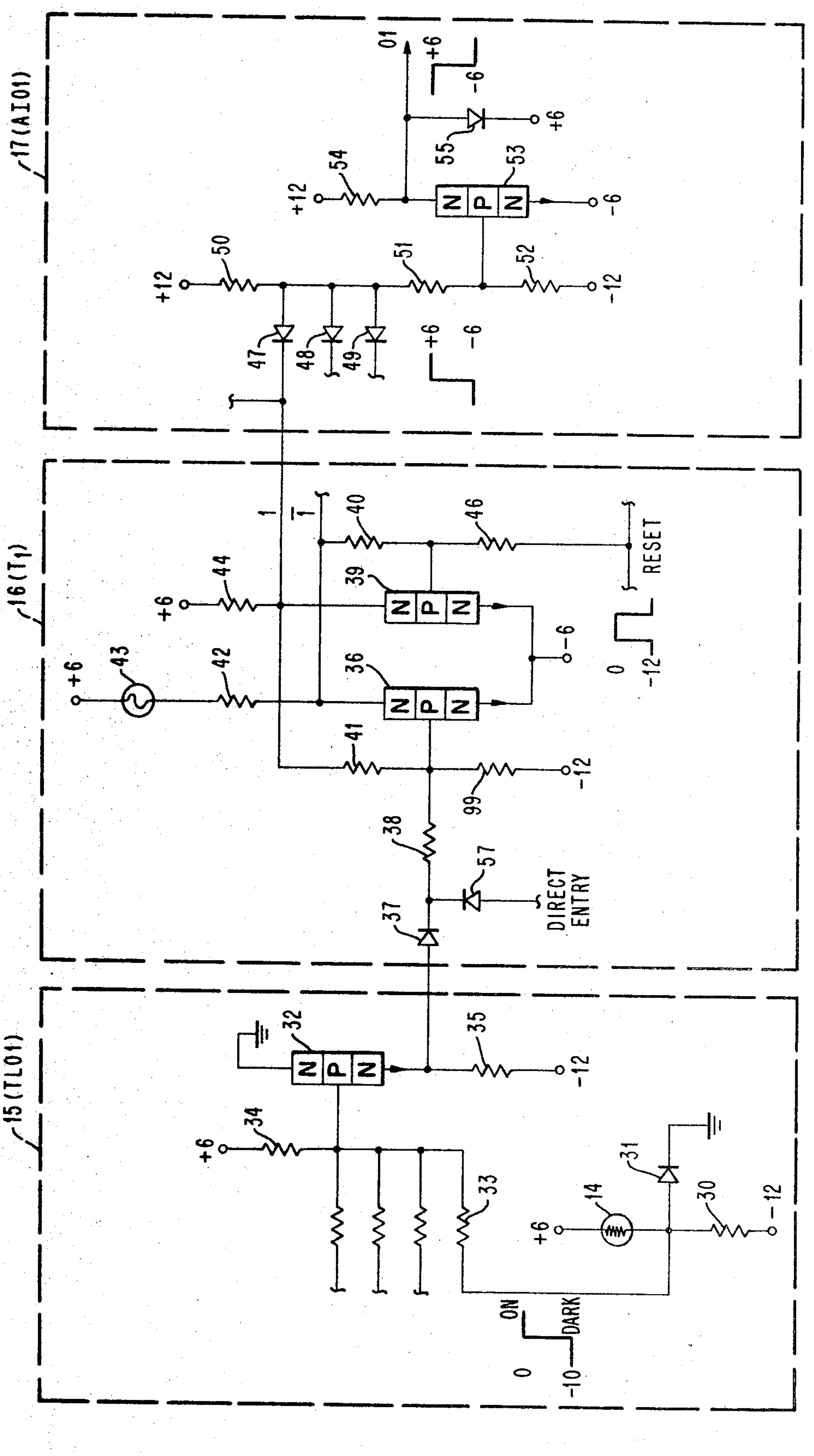
Figure 4:
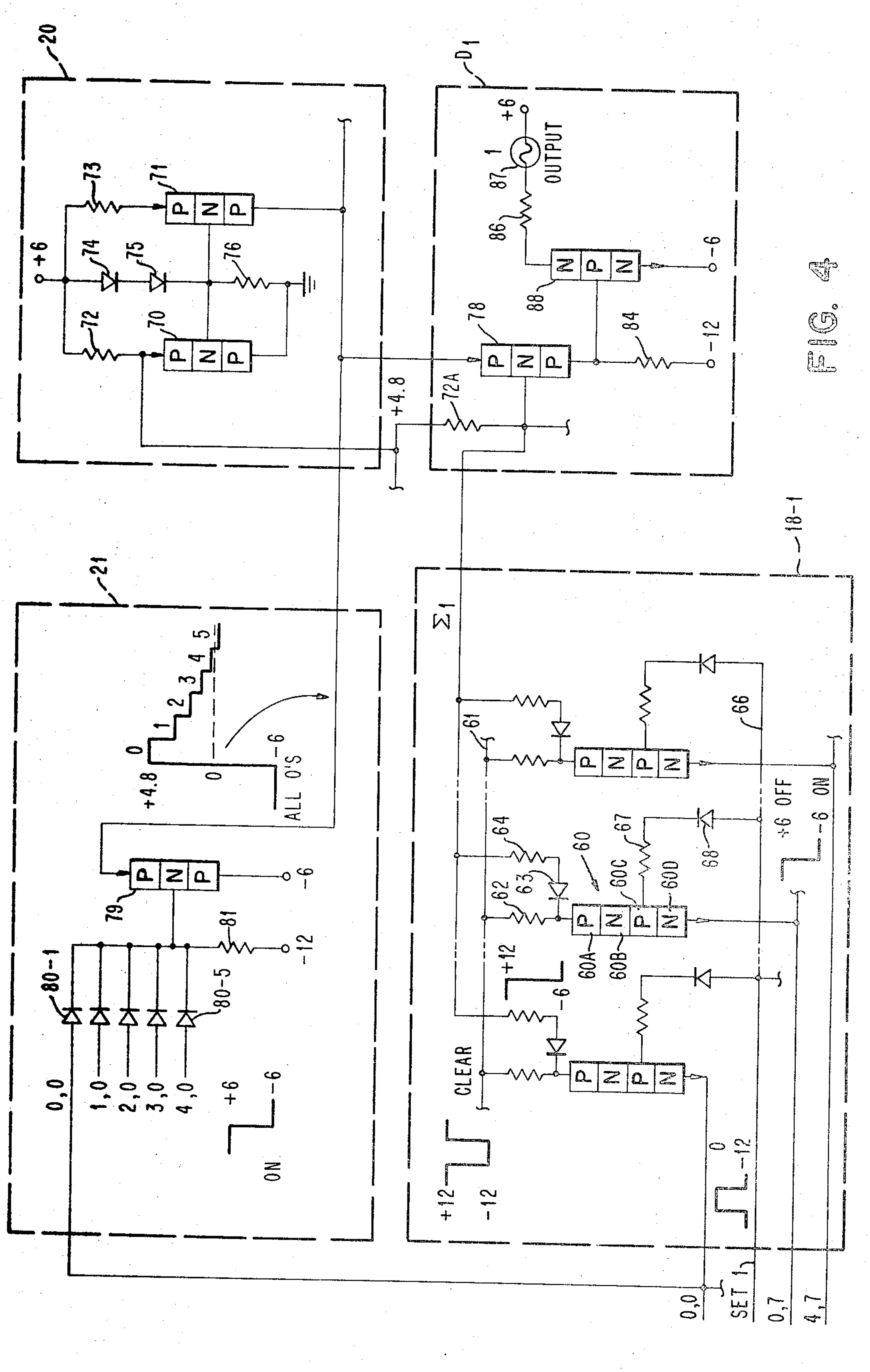

FIGS. 2–4 inclusive, are detailed schematic diagrams of various components illustrated in block form in FIG. 1.

In FIG. 1, an input matrix 11 in cooperation with a manually operated light pen provides a digital signal representative of a graphic symbol such as the numeral (3) illustrated superimposed on the matrix 11. The matrix 11 includes 60 photosensitive elements 14 arranged in related groups of four in a (3 x 5) submatrix. When the light from the light pen impinges on any two elements 14 in a group of four elements an output is provided by threshold logic circuits 15 and stored in input storage circuits 16. The details of the above circuits and those which will be described in connection with the description of FIG. 1 are shown in FIGS. 2–4 and will be described later.

The contents of the input storage circuits 16 are arranged in matrix form and correspond directly with the input matrix 11. The first horizontal row of groups of four sensors 14 are grouped as a single entity and the left most group is arbitrarily assigned a weight of one. The center group is assigned a weight of two and the right group a weight of four. In the example illustrated, the left and center groups each have two or more sensors 14 which have detected light, thus the one and two weighted positions in the input storage circuits of the first horizontal line assume a state indicative of this condition; this fact is symbolically represented in this figure by "ones" appearing in the corresponding locations of block 16. The right group has only one sensor which detected light and this is indicated by the zero in the corresponding position in the input circuits 16.

The data in each horizontal row of input storage 16 is inserted in the corresponding row of an expanded input matrix circuit 17. This expansion converts as many as three bits in storage 16 into a single bit in matrix 17. In the illustrated example, the sum of the weights of the first row in input storage 16 is three and the corresponding row of matrix 17 contains a single bit designated 3 to indicate the sum of the weights. The second row has a weight of four and expansion circuit 17 provides a single output indicating this weight. In like manner, rows 3, 4 and 5 provide via expansion matrix 17 single outputs indicative thereof.

A detailed block diagram of the circuits thus far described is shown in FIG. 2. In the figure, the photocells 14 which have detected light from the pen 12 are shown in solid black and those which did not detect light as open circles. Only one row of photocells has been illustrated since the arrangement and connections of the other rows are identical. The four photocells in the left area are connected to a threshold logic circuit TL01 which sets a trigger T1 when two or more of cells 14 detect the light from pen 12. The center group of four cells are connected to a threshold logic circuit TL02 which sets a trigger T2 when two or more cells detect light from pen 12 and the right hand group of cells are connected to threshold logic circuit TL03 which sets a trigger T3 when two or more connected cells detect light from pen 12. In the illustrated example, only triggers T1 and T2 of row one are set. Trigger T3 of row one remains reset since only one cell 14 of the right hand group of four cells detected light from pen 12. The details of the threshold logic circuit are shown in FIG. 3 and will be described later.

Triggers T1, T2 and T3 of input storage circuit 16 provide complementary output (1, 1), (2, 2) and (4, 4) respectively. These outputs are connected to eight "AND Invert" circuits AI00 to AI07 as shown to provide a single output as determined by the states of triggers T1, T2 and T4. The table below indicates the trigger conditions providing the eight output 00 to 07 inclusive.

| | T1 | T2 | T4 |
|---|---|---|---|
| AI00 | $\bar{1}$ | $\bar{2}$ | $\bar{4}$ |
| AI01 | 1 | $\bar{2}$ | $\bar{4}$ |
| AI02 | $\bar{1}$ | 2 | $\bar{4}$ |
| AI03 | 1 | 2 | $\bar{4}$ |
| AI04 | $\bar{1}$ | $\bar{2}$ | 4 |
| AI05 | 1 | $\bar{2}$ | 4 |
| AI06 | $\bar{1}$ | 2 | 4 |
| AI07 | 1 | 2 | 4 |

Each of the other four horizontal rows of expanded matrix 17 includes eight similar "AND Invert" circuits, thus providing a total of forty possible outputs any one of which in each will be active at any given time. The non-illustrated outputs will fall in four groups (1, 0) to (1, 7), (2, 0) to (2, 7), (3, 0) to (3, 7) and (4, 0) to (4, 7). The forty outputs of the expanded matrix 17 are applied in parallel to forty corresponding memory elements in a plurality of electronic templates (18–1) to (**18–*n*). The circuit details of the template are shown in FIG. 4 and will be described later. The number of templates provided will be determined by the number of patterns which require categorization and of course will be limited by the number of bits available in the matrix 11. In the drawings, four templates are illustrated for categorizing the numerals 1, 2, 3 and 0**.

Initially all forty memory elements in each of the templates occupy a zero state and each must be trained on a particular pattern. If the pattern is invariable which would be the case for printed characters, a single training cycle would suffice. However where free hand characters are to be processed a small number of training cycles will be required for each. The number of training sequences will be determined by the total number of variations in the pattern and the proximity of variations in other patterns. If the patterns are substantially invariable or widely divergent a single training cycle may be sufficient. However, in speech and manually reproduced graphics, this is unlikely and a number of training cycles for each pattern will be required. The exact number for each will depend on the variations the proximity of other patterns and will vary from one pattern to another. If there is insufficient data in the templates to distinguished two or more patterns, the circuit illustrated will provide multiple indications thus informing the operator that additional training on the indicated patterns is required. Very often one additional pass will suffice, however, several may be required. In either event the time required for the additional training is minimal.

In the illustrated example, five training cycles were used for the numeral one, four cycles for the numeral two, two cycles for the numeral three and two cycles for the numeral zero. A training cycle is accomplished by selecting one of the *n* templates by providing an appropriate voltage to the associated "set" line after generating an example of the character to be categorized by the selected template on the input matrix 11. The output from the expanded matrix thus developed places the associated memory units in the selected template in a "one" state. The memory elements placed in the "one" state by prior training cycles are illustrated by circles in the appropriate locations of the various templates. When a template is trained, the appropriate voltage is removed from the set line and the template is fully conditioned and ready to examine inputs for categorization purposes.

Figure 1A:
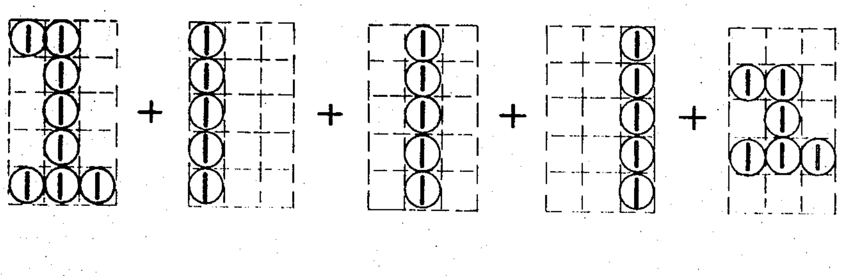
FIGS. 1A–1C illustrate several configurations of the numerals 1, 2 and 0, respectively.
Figure 1B:
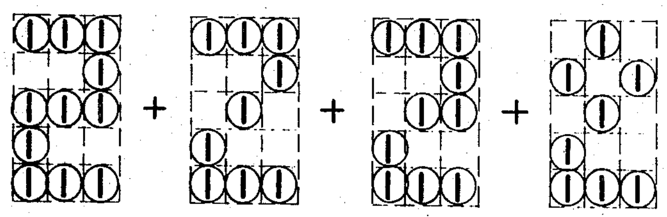
Figure 1C:
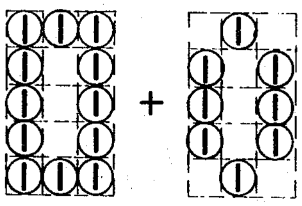

After one template has been trained on each of the patterns to be categorized via the above described process operation may begin. FIG. 1A illustrates five configurations of the numeral (1) used for training template 18–1 and the pattern of "ones" and "zeros" in the memory comprising the template. Note in the drawing, a blank space denotes a "zero" condition and a circle a "one" condition. FIG. 1B illustrates four configurations of the numeral (2) used to train template 18–2 and FIG. 1C illustrates two configurations of the numeral (0) used to train template **18–*n*. Two configurations were used to train template 18–3 for the numeral (3). One of the two is illustrated in FIG. 1 and the other while not illustrated is apparent from the storage condition of template 18–3**.

In the illustrated example a graphic symbol for the numeral (3) is inserted in the matrix 11 by pen 12. This symbol is threshold detected by circuit 15 and produces the storage pattern illustrated in storage circuit 16. After expansion in circuits 17, the outputs indicated by the ones (1's) within the block are applied in parallel to the templates 18. Whenever a "one" output is applied to a memory in a template, it provides one unit of weight and all of the units are summed. Template 18–1 provides three units, template 18–2 two units, template 18–3 five units and template **18–*n* zero units. The table below gives the coordinates of those memory elements in each template which receives a "one" output from the expansion matrix 17**. In those instances where the addressed memory element is in a "one" state, one unit of output is provided. If the addressed element occupies a "zero" state, no output is provided.

| Row, col. | | 18–1 | 18–2 | 18–3 | 18–*n* |
|---|---|---|---|---|---|
| (0, 3) | | 1 | 0 | 1 | 0 |
| (1, 4) | | 1 | 1 | 1 | 0 |
| (2, 6) | | 0 | 1 | 1 | 0 |
| (3, 4) | | 1 | 0 | 1 | 0 |
| (4, 3) | | 0 | 0 | 1 | 0 |
| Σ | = | 3 | 2 | 5 | 0 |

Templates 18–1, 18–2, 18–3 and **18–*n* are provided with decision units D1, D2, D3 and D*n*, respectively. The summed or weighted template outputs set forth above are applied to the respective decision units. A constant current interlock circuit 20 connected to decision units D1 to D*n* provides a variable threshold established by that template providing the largest output. A blank interlock circuit 21 connected to the expanded matrix 17 detects a zero condition and inhibits an output by exercising control over the constant current interlock circuit 20**. The details of the decision units; the constant current interlock and blank interlock circuit are shown in FIG. 4 and will be described later. While only the blank interlock circuit has been shown any other code conditions may be detected for inhibiting the output should such a function be desired.

The circuit details of threshold logic circuits 15, input storage circuit 16 and expanded input matrix 17 are shown in FIG. 3. In each instance, only one functional element has been illustrated since the remaining functional elements, indicated in FIGS. 1 and 2, are identical in both construction and connection. Photoconductor 14 is connected in series with a resistor 30 between a +6 volt supply and a −12 volt supply. The common junction of photoconductor 14 and resistor 30 is connected to ground by a diode 31. In addition, this common junction is connected to the base of an NPN transistor 32 by a resistor 33. The base is connected to a +6 volt supply by a resistor 34. The collector of transistor 32 is connected to ground and the emitter is connected to a −12 volt supply by a resistor 35.

When photoconductor 14 is exposed to light, it becomes conductive and forward biases diode 31 placing the common junction of photoconductor 14 and resistor 30 at ground potential. When two or more photoconductors connected to the base of transistor 32 via resistor 33 becomes conductive the base of transistor 32 rises above −6 volts and the emitter follows, rising to substantially the same voltage as the base. The emitter of transistor 32 is connected to the base of a second transistor 36 by a diode 37 and a resistor 38.

Transistor 36 along with another transistor 39 comprises a trigger circuit. The collector of transistor 36 provides the complementary output while the collector of transistor 39 provides the output of the trigger. The collector of transistor 36 is connected by a resistor 40 to the base of transistor 39 and the collector of transistor 39 is connected to the base of transistor 36 by a resistor 41. The collector of transistor 36 is connected to a +6 volt supply by a resistor 42 and a lamp 43.

The collector of transistor 39 is connected to the same +6 volt supply by a resistor 44. The base of transistor 36 is connected to a —12 volt bias supply by a resistor 99 while the base of transistor 39 is connected to a —12 volt supply by a resistor 46. The connection to the base of transistor 39 via resistor 46 is provided with a dual voltage by which a reset pulse may be applied to the transistor by causing the voltage to momentarily go to ground. This reset function is manually performed whenever the storage condition of the transistors are required to be reset by an operator. When the emitter of transistor 32 rises above —6 volts as previously described, the negative bias potential on the base of transistor 36 is removed causing conduction through transistor 36 and the collector goes to —6 volts. This potential causes transistor 39 to be cut off and the collector of transistor 39 goes to the +6 volt supply voltage thus indicating the one state for the trigger.

The AND Invert circuit AI01 has three diodes 47, 48 and 49 connected to a +12 volt supply via a resistor 50 and to a —12 volt supply by series connected resistors 51 and 52. The common junction of resistors 51 and 52 is connected to the base of an inverting transistor amplifier 53. The emitter of transistor 53 is connected to a —6 volt supply and the emitter to a +12 volt supply by a resistor 54. The collector of transistor 53 provides the output illustrated in FIG. 2 and indicates the state of the 01 position. The collector is connected to a +6 volt supply by an isolating diode 55. Thus, when the transistor 53 is cut off, the output is clamped at +6 volts. However, when the transistor 53 is turned on by a coincidence of the positive voltages to the cathodes of diodes 47, 48 and 49, the —6 volt potential appearing at the collector back biases diode 55 and provides a —6 volt output at the 01 output.

The collector of transistor 39 is connected to the cathode of diode 47. The cathode of diodes 48 and 49 are connected to the complementary output of trigger T2 and the complementary output of trigger T3, respectively, Thus, when trigger T1 is set to the one state and triggers T2 and T3 are set to the 0 state, the base of transistor 53 becomes sufficiently positive to cause transistor 53 to conduct, thus causing the collector of transistor 53 to go to the —6 volt level indicating an output.

A diode 57 connected to the base of transistor 36 via resistor 38 provides for direct entry of data into trigger T1 from another source. This may be from a speech analyzer which may produce a digital code from a spoken word. Thus, spoken digits may be entered into storage as well as handwritten digits.

The circuit details of the template 18–1 of the decision unit D1, of the blank interlock circuit 21 and the constant current interlock circuit 20 are shown in FIG. 4. In each instant, one of several functional units have been illustrated since the remaining functional elements are identical in both construction and connection.

The template is constructed of 40 memory elements. Each memory element includes a silicon control switch 60 which includes an anode 60A, an anode gate 60B, a control gate 60C and a cathode 60D. The anode 60A is connected by a resistor 62 to a clear line 61 which is normally at +12 volts, however when it is desired to clear a given template, this line is changed to —12 volts potential for clearing all of the memory elements in the template. How this is accomplished will be described later in connection with the description of this figure.

In addition the anode is connected to the sum or output line by a diode 63 and a resistor 64 connected in series. The anode gate is not connected since the connection to this gate is not necessary and provides greater sensitivity when it remains disconnected. The control gate 60C is connected to a set line 66 by a resistor 67 and a diode 68 connected in series. Set line 66 is normally at —12 volts and is raised to 0 volts or ground potential at any time it is desired to insert information into the memory elements of the template.

The cathode 60D of silicon control transistor 60 is connected to AND Invert circuit AI07. The 39 remaining silicon control transistors are connected to the AND Invert circuit 00 to 47. The only other connections illustrated in the drawings are those to AI00, the lowest order AND Invert circuit and the connection to AI47 the highest order AND Invert circuit. The intermediate ones are not shown since these connections are quite obvious and would only tend to confuse the description. When training is desired, the set line voltage is changed manually or automatically from —12 to 0 volts after a pattern has been inserted into the input matrix causing five selected AND Invert output lines from 00 to 47 to go from +6 volts to —6 volts, those units connected to —6 volt lines will be turned on or placed in the one state. When a memory unit turns on, or is placed in a one state, the anode drops from +12 volts to —6 volts as current flows in resistor 62 to the clear lines which is normally at +12 volts. This change in voltage forward biases diode 63 causing current to flow in resistor 64. The memory units which have been turned on by the coincidence of —6 volts at the cathode and 0 volts at the control gate follow the input to the cathode. When the input is at the +6 volt level or the off level, conduction is sustained by current flowing from the +12 volt clear line 61. At this time, the diode 63 is back biased and decouples the Σ1 line from the input lines which are in the off position. When the input line of a previously activated unit that is a memory unit which has been turned on or set to the one condition, goes to the —6 volt level, diode 63 becomes forward biased and the Σ1 or sum line is connected via resistor 64 to the anode of memory element 60 thus completing a circuit. If none of the input lines are at —6 volts, the Σ1 line remains substantially disconnected from any of the anodes 60A and thus no appreciable current except for minute leakage current which flows in this conductor. The amount of current flowing in the Σ1 conductor will be a function of how many of the five possible input lines are applied to previously conditioned memory element 60.

If it is desired to clear the memory units in the template from previous training, the clear line 61 is momentarily shifted to —12 volts. This cuts off conduction in all of the silicon control switches 60 and clears the remembered conditions in the template. At this point, additional training is required in order to create a pattern of conduction and nonconduction in the various memory elements 60 comprising the template.

The constant current interlock circuit 20 includes a pair of transistors 70 and 71. The emitters of the two transistors are connected to a +6 volts supply by a pair of resistors 72 and 73, respectively. The +6 volt supply is connected by a series connected pair of diodes 74 and 75 to the bases of the transistors 70 and 71. The bases of the transistors are in turn connected to ground by a resistor 76 and the collector of transistor 70 is also connected to ground. With this arrangement, the emitters of transistors 70 and 71 will follow each other. Transistor 70 provides at its emitter a reference voltage which is a constant voltage and is utilized as will be described later. Current through transistor 71 is constant under all conditions and will not vary with load.

The collector of transistor 71 is connected to the emitter of the transistor 78 in the decision unit D1 and to the emitter of a transistor 79 in the blank interlock circuit 21.

A plurality of diodes 80-1 through 80-5 in the blank interlock circuit are connected to the 00, 10, 20, 30 and 40 outputs of the AND Invert circuits AI00, AI10, AI20, AI30 and AI40, respectively. The diodes 80-1 through 80-5 and a resistor 81 connected to a −12 volts supply comprise an AND circuit which causes the base of transistor 79 to go to −6 volts when all of the above inputs are at the −6 volt level, thus placing the emitter of transistor 79 at −6 volts as well as the emitter of transistor 78. The emitters of transistors 79 and 78 will be at some other voltage under other conditions than this just described. That is, when at least one of the inputs connected to diodes 80-1 through 80-5 are at +6 volts thus indicating other than the all zeros condition, the voltage of the emitters of transistors 78 and 79 will depend on the largest sum Σ provided by one of the templates.

A graph inserted on the line connecting these two emitters indicates the relative voltage of this line for different storage conditions and coincidences in the template with the highest coincidences. If no coincidences occur, this line will be at approximately 4.8 volts with the circuit described. If one coincidence occurs, the voltage drops a substantial amount from the 4.8 towards 0, with two drops somewhat more, with three, an additional amount, with four it drops to just above 0 volts and with five slightly below 0 volts.

The bias voltage supplied to the base of transistor 78 is controlled by the storage condition in the template. That is by the current drawing by resistors 64 connected in parallel to the Σ1 line which current causes a voltage drop in a resistor 72A from base of transistor 78 to the +4.8 volt reference line. The interaction and control of the emitter voltage described above is via the control of the base bias on transistors 78 and that decision unit connected to the template with the greatest number of coincidences will control the voltage at the emitter of transistors 79 since all of the decision units D1 through DN are connected at this point and thus provides a variable threshold which will inhibit conduction through all but one of the transistors 78.

The collector of transistor 78 is connected to a −12 volt bias supply by a resistor 84 and to the base of an output transistor 88. The emitter of transistor 88 is connected to a −6 volt supply and the collector via a resistor 86 and an indicator lamp 87 to a +6 volt supply. When the decision unit is selected as described above, the indicator lamp 87 glows indicating that the input via the input matrix 11 corresponds most nearly to the storage conditions in the connected template, thus indicating to the operator that the input was that designated by the particular output selected. In this case, the output illustrated is the output for 1 and the template stores the data defining the graphic symbol 1.

It should be noted in connection with the threshold effect described above that voltage applied to the emitter of the transistors 78 is controlled by the template providing the largest number of coincidences, however the voltage applied to the base of any given transistor 78 is controlled by the number of coincidences in that particular template associated with the specific transistor 78. Thus, the forward bias on transistor 78 will be insufficient for all but that transistor associated with the template having the highest number of coincidences. If two or more templates have a similar number of coincidences, both indicators associated with the transistors 78 and 88 will be eliminated thus indicating a need for further training.

Blank interlock circuit 21 described above senses the condition of all zeros in the expanded matrix 17. Instead of sensing all zeros any other predetermined code could be wired in and more than one blank interlock circuit could be provided. This would necessitate the addition of a plurality of AND gates and OR gates connected to the base of transistor 79; in those instances where a plurality of preselected codes are desired to inhibit the output from the templates. Furthermore, by appropriate arrangement of the constant current interlock, the decision units may be arranged such that where two or more decision units have the same number of coincidences outputs may be inhibited on all. This merely requires an adjustment of the operating bias condition of transistor 71. In an embodiment of the invention which was constructed, the following component values were utilized in the circuits described above.

Resistors:
- 30 and 51—4.7K ohms
- 33, 46, 49 and 52—27K ohms
- 34, 64 and 81—47K ohms
- 35—3K ohms
- 38—1.5K ohms
- 40, 50 and 72A—10K ohms
- 42 and 86—150 ohms
- 44—560 ohms
- 54—1K ohms
- 62—12K ohms
- 67—180K ohms
- 72—100 ohms
- 73—1.2K ohms
- 76—470 ohms
- 84—20K ohms Transistors:
- 32, 36, 39, 53, 73, 74, 78, 79 and 85—May be logic grade of medium power capacity Thyristors (silicon controlled switches) 60—May be 3N58 or its equivalent Diodes:
- 31, 37, 47, 48, 49, 55, 57, 63, 68 and 80—Germanium
- 74 and 75—Silicon As previously pointed out, the invention is useful for categorizing patterns of any type whether they be graphic patterns, speech patterns or any other pattern which can be expressed as a plurality of binary bits. The graphic pattern categorization was chosen for illustration since its simplicity illustrates the application of the invention. The particular mode of digitization of the pattern does not constitute part of the invention and any digitized pattern by whatever process may be categorized by the disclosed invention.

While the invention has been particularly shown and described with reference to a preferred embodiment thereof, it will be understood by those skilled in the art that various changes in form and detail may be made therein without departing from the spirit and scope of the invention.

What is claimed is:

1. An adaptive template for use in a pattern categorization system for categorizing patterns expressed as a plurality of binary bits occupying first or second states comprising:
- a plurality of silicon controlled switches each including an anode, an anode control gate, a control gate and cathode,
- means for appying electric signals corresponding to the binary bits to the cathodes of the corresponding silicon controlled switches,
- selectively operable means connected to the control gates for causing the switches to become conductive when the signal corresponding to the bit applied to the cathode of any given switch assumes the first state thereby adaptively conditioning each said switch, and
- means connected in parallel to the anodes of all the switches for providing on a subsequent application of said plurality of electric signals corresponding to the bits to the cathodes and output indicative of the number of electric signals corresponding to the bits in said first state applied to the cathodes of previously conditioned switches in the template.

2. An adaptive template as set forth in claim 1 in which said means connected in parallel to the anode of each switch for providing an output indicative of the number of electric signals corresponding to bits in the first state applied to the cathodes of previously conditioned switches include, means providing a constant current source and a constant voltage source, amplifier means having an input, output and control electrodes, means connecting the constant current source to the input electrode of the amplifier, and means connecting said control electrode to the constant voltage source and to the anodes of the silicon controlled switches for adjusting the bias voltage on the control electrode as a function of the number of electric signals corresponding to bits in the first state applied to previously conditioned silicon controlled switches whereby the voltage of the input electrode is a function of the number of electric signals corresponding to bits in the first state applied to previously conditioned silicon controlled switches.

3. A pattern categorization system for categorizing a pattern expressed as a plurality of binary bits comprising:

a plurality of adaptive templates responsive in parallel to electric signals corresponding to said plurality of binary bits for simultaneously comparing the electric signals corresponding to the bits with preset data in the templates, said templates each comprising:

a plurality of silicon controlled switches each including an anode, an anode control gate, a control gate and a cathode, means for applying the electric signals corresponding to the binary bits to the cathodes of the corresponding silicon controlled switches, selectively operable means connected to the control gates for causing the switches to become conductive when the electric signal corresponding to the bit applied to the cathode of any given switch assumes a first state thereby adaptively conditioning each said switch, output means connected to the anodes of the switches for providing on a subsequent application of said plurality of electric signals corresponding to the binary bits to the cathodes an output indicative of the number of electric signals corresponding to the bits in said first state applied to the cathodes of previously conditioned switches in the template, and means responsive to the output means of each said template for establishing a variable threshold for inhibiting all but the largest output.

References Cited

UNITED STATES PATENTS

| | | | |
|---|---|---|---|
| 3,011,155 | 11/1961 | Dunlap | 340—173 |
| 3,104,369 | 9/1963 | Rabinow et al. | 340—146.3 |
| 3,234,392 | 2/1966 | Dickinson | 340—146.3 X |
| 3,267,439 | 8/1966 | Bonner | 340—146.3 X |
| 3,333,248 | 7/1967 | Greenberg et al. | 340—146.3 X |
| 3,375,502 | 3/1968 | Shively | 307—238 X |

MAYNARD R. WILBUR, Primary Examiner

L. H. BOUDREAU, Assistant Examiner

U.S. Cl. X.R.

307—238; 340—173